No. 663,499. Patented Dec. 11, 1900.
M. JOHNSON.
CAR MOVING MECHANISM.
(Application filed Apr. 23, 1900.)
(No Model.)
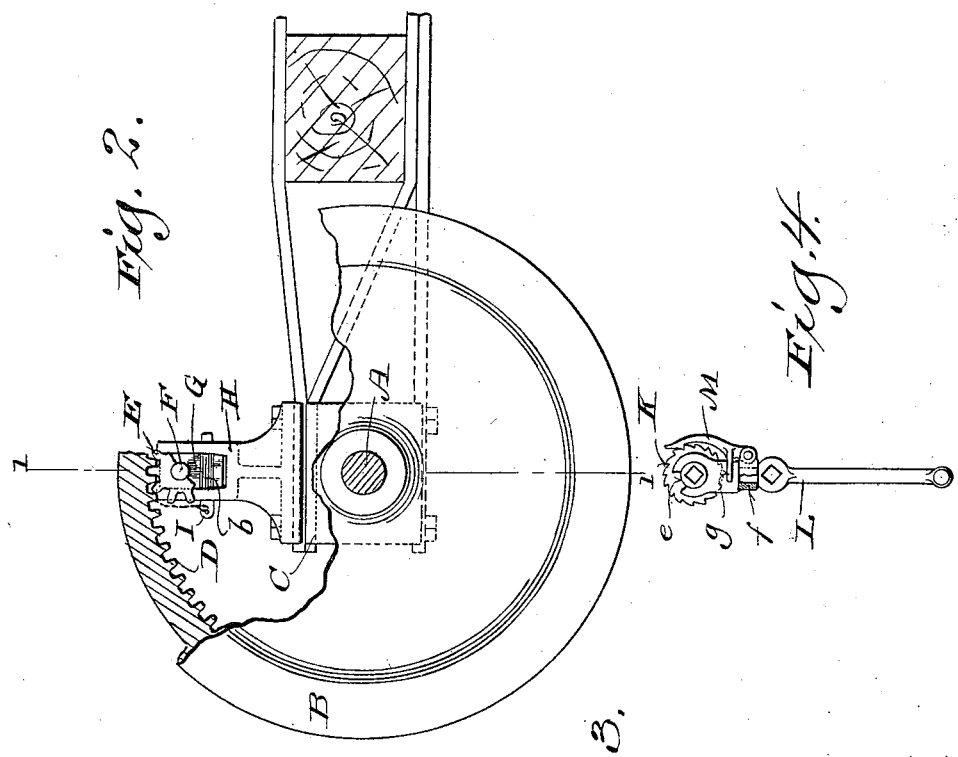
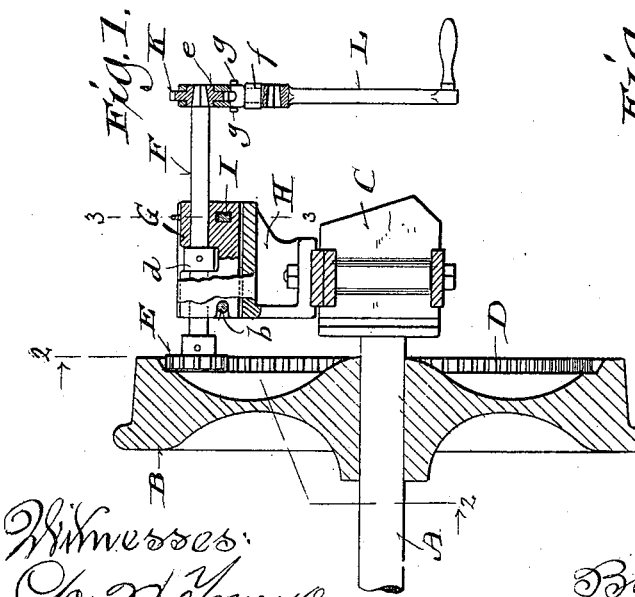

UNITED STATES PATENT OFFICE.

MARTIN JOHNSON, OF MILWAUKEE, WISCONSIN.

CAR-MOVING MECHANISM.

SPECIFICATION forming part of Letters Patent No. 663,499, dated December 11, 1900.

Application filed April 23, 1900. Serial No. 13,919. (No model.)

*To all whom it may concern:*

Be it known that I, MARTIN JOHNSON, a citizen of the United States, and a resident of Milwaukee, in the county of Milwaukee and State of Wisconsin, have invented certain new and useful Improvements in Car-Moving Mechanism; and I do hereby declare that the following is a full, clear, and exact description thereof.

My invention has for its object to provide for easy moving of railway-cars by manual power when a locomotive is not available; and it consists in certain peculiarities of construction and combination of parts hereinafter particularly set forth with reference to the accompanying drawings and subsequently claimed.

Figure 1 of the drawings represents a partly-sectional view on the plane indicated by line 1 1 in the succeeding figure and illustrates an assemblage of parts in accordance with my invention whereby manual power may be utilized for easy movement of a railway-car, whether loaded or otherwise; Fig. 2, a detail side elevation, partly broken away and in section, the break being indicated by lines 2 2 in the preceding figure; Fig. 3, a detail transverse section indicated by line 3 3 in the first figure; and Fig. 4, a detail elevation of a ratchet-crank mechanism constituting part of said invention, parts of this mechanism being broken.

Referring by letter to the drawings, A indicates a portion of an axle constituting part of a railway-car truck, B a wheel on the axle, and C an axle-box of the truck. The wheel is cast or otherwise provided with a circular series of outer cogs projecting inward from its rim to constitute an internal gear D for the engagement of a pinion E, fast on a spindle F, that has its bearings in a block G, seated in a socket-casting H, held on the axle-box C of the truck by the bolts and nuts employed to unite said axle-box and a truss of the truck. The socket portion of the casting H is shown provided with transverse stay-pin $b$, engaging a notch in block G, and a transverse slip-pin I, engaging said casting and block, serves to hold the latter in detachable connection with the former. A flexible hanger $c$ may be employed to attach the slip-pin I to block G, as shown in Fig. 3. A collar $d$ on the spindle F between its bearings rotates in a notch provided in block G, and thus said spindle is held against longitudinal movement. The outer end of the spindle is made polygonal to fit corresponding apertures formed in the hub $e$ of a ratchet-wheel K and in a crank L, a forked end of the crank being loose on said hub. In pivotal connection with a clip $f$ on the crank is a pawl M, engaged with the ratchet-wheel, this pawl being provided with arms $g$, that oppose sides of the crank to prevent pivotal displacement of the clip.

In practice it is intended that mechanism consisting of the pinion-carrying spindle F, its bearing-block G, and the slip-pin I, with a crank L and pawl M, shall be kept about railway-car yards and other places having railway-track facilities for connection with car-trucks provided with socket-castings and wheels having internal gear similar to what has been specifically set forth in the foregoing. By utilizing the said mechanism in conjunction with said truck-wheel a car or cars may be readily started and kept moving under control by the exertion of manual power. When the load is heavy, the hub of the ratchet-wheel K will be slipped on spindle F and the crank L reciprocated in conjunction with pawl M to facilitate rotation of the same; but for empty cars or light-load cars said crank may be fitted direct to said spindle and rotated to accomplish the desired result.

In practice the general construction and arrangement of parts herein shown and described may be somewhat varied without departure from my invention.

Having thus described my invention, what I claim as new, and desire to secure by Letters Patent, is—

1. A railway-car truck having a wheel thereof provided with a circular series of inwardly-projecting outer cogs, a support on the axle-box adjacent to said wheel, a bearing-block having detachable connection with the support, a crank-spindle rotative in the block, and a pinion fast on the spindle to mesh with the internal gear of the aforesaid wheel.

2. A railway-car truck having a wheel thereof provided with a circular series of inwardly-projecting outer cogs, a support on the axle-box adjacent to said wheel, a bearing-block having detachable connection with the support, a spindle rotative in the block, a pinion fast on the spindle to mesh with the internal gear of the aforesaid wheel, and a crank in detachable connection with said spindle.

3. A railway-car truck having a wheel thereof provided with a circular series of inwardly-projecting outer cogs, a support on the axle-box adjacent to said wheel, a bearing-block having detachable connection with the support, a spindle rotative in the block, a pinion fast on the spindle to mesh with the internal gear of the aforesaid wheel, a ratchet-wheel on the outer end of said spindle, a crank in pivotal connection with the ratchet-wheel hub, and a pawl in connection with the crank to engage said ratchet-wheel.

4. A railway-car truck having a wheel thereof provided with a circular series of inwardly-projecting outer cogs, a support on the axle-box adjacent to said wheel, a bearing-block having detachable connection with the support, a spindle rotative in the block, a pinion fast on the spindle to mesh with the internal gear of the aforesaid wheel, a ratchet-wheel in angular slip fit on the outer end of said spindle, a crank in pivotal connection with the ratchet-wheel hub, and a pawl in connection with the crank to engage said ratchet-wheel.

5. A railway-car truck having a wheel thereof provided with a circular series of inwardly-projecting cogs, a support on the axle-box adjacent to said wheel, a bearing-block having detachable connection with the support, a spindle rotative in the block, a pinion fast on the spindle to mesh with the internal gear of the aforesaid wheel, a ratchet-wheel having an angular bore for slip-fit connection with the outer end of said spindle, a crank in pivotal connection with the ratchet-wheel hub and of itself provided with an angular aperture for slip fit on the aforesaid spindle, and a pawl in connection with the crank to engage said ratchet-wheel.

In testimony that I claim the foregoing I have hereunto set my hand, at Milwaukee, in the county of Milwaukee and State of Wisconsin, in the presence of two witnesses.

MARTIN JOHNSON.

Witnesses:
N. E. OLIPHANT,
B. C. ROLOFF.